No. 775,124. Patented November 15, 1904.

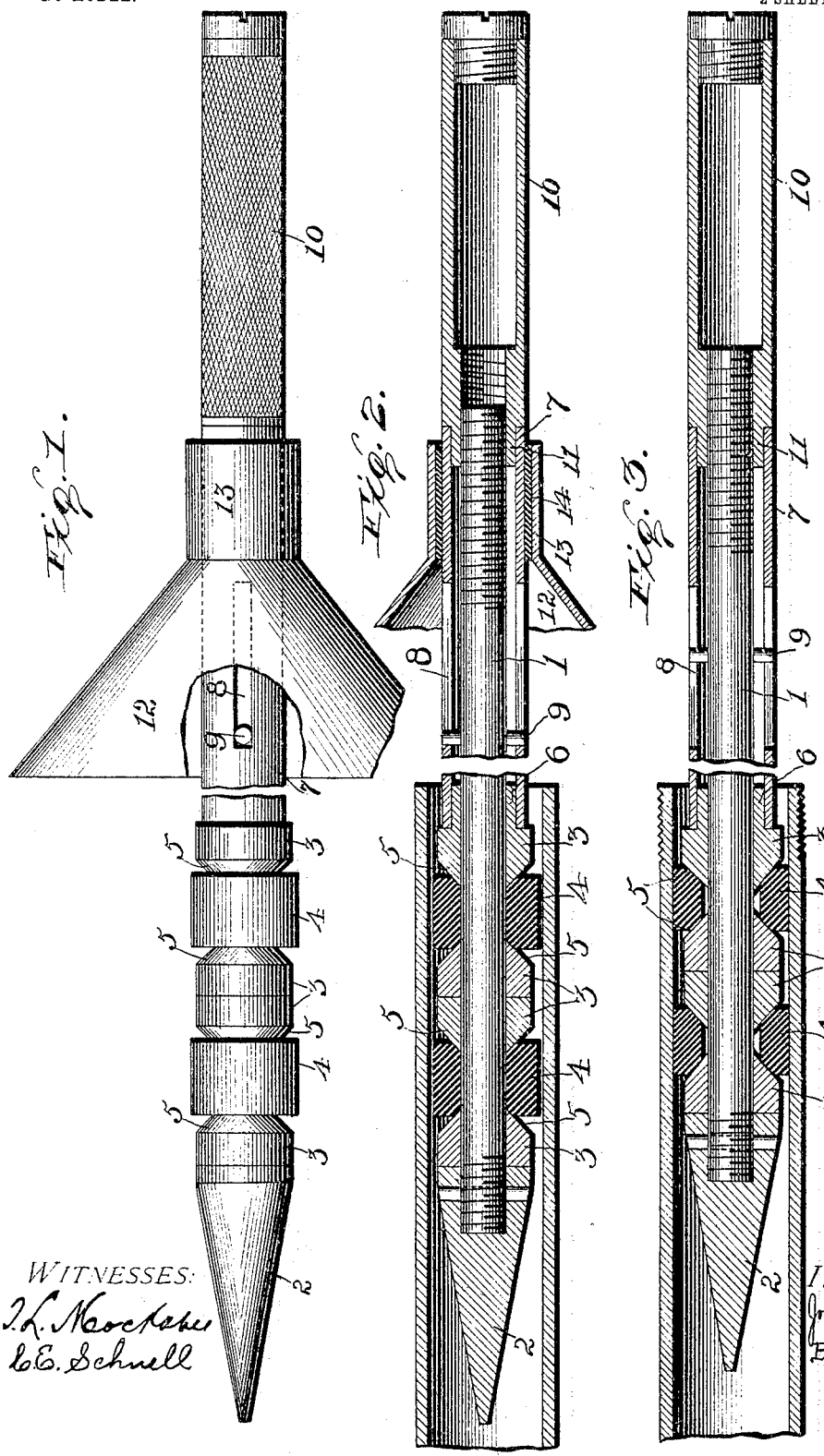

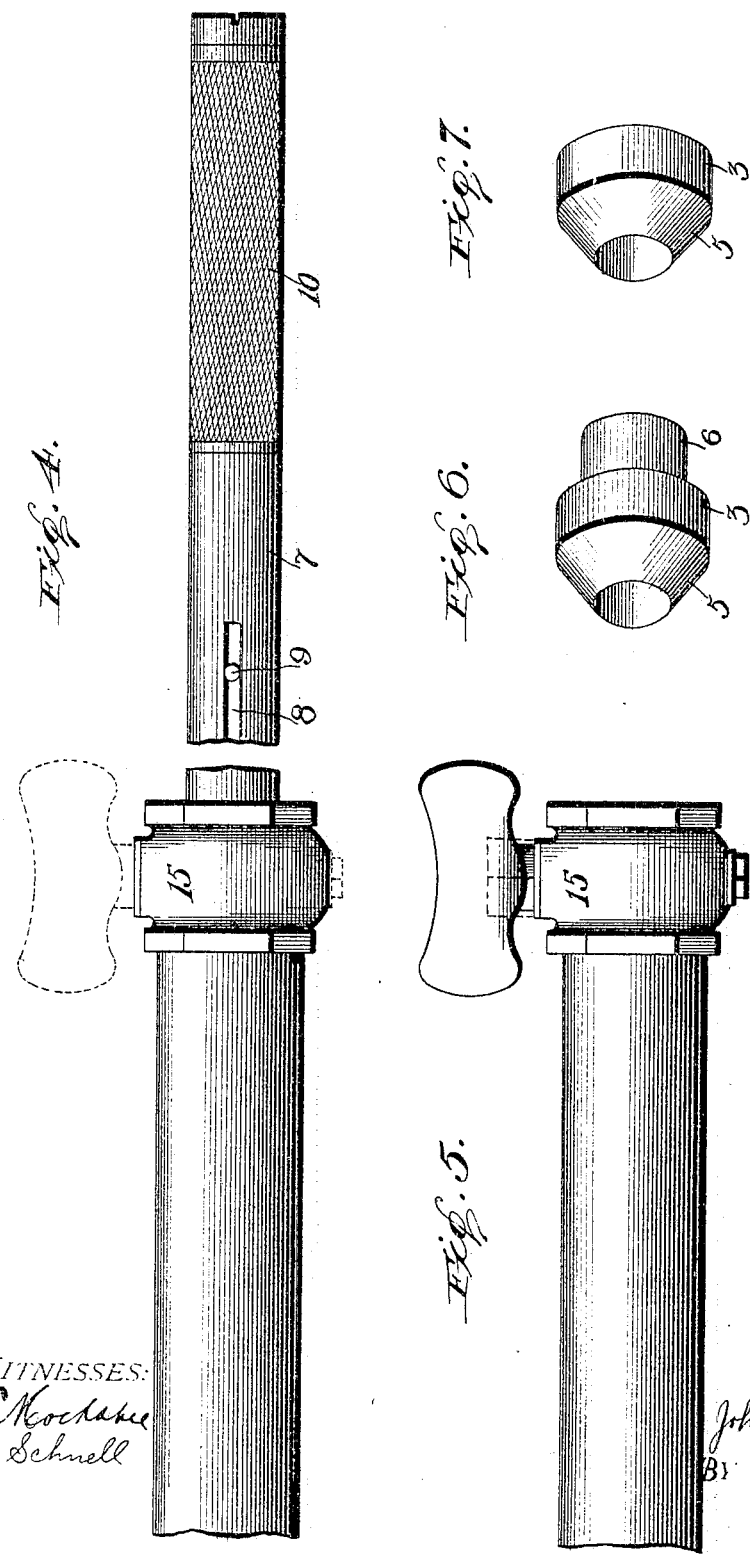

UNITED STATES PATENT OFFICE.

JOHN HENRY CHRISTMAN, OF CARLISLE, PENNSYLVANIA.

TOOL FOR AND PROCESS OF REPAIRING PIPES.

SPECIFICATION forming part of Letters Patent No. 775,124, dated November 15, 1904.

Application filed April 27, 1904. Serial No. 205,189. (No model.)

*To all whom it may concern:*

Be it known that I, JOHN HENRY CHRISTMAN, a citizen of the United States, residing at Carlisle, in the county of Cumberland and State of Pennsylvania, have invented certain new and useful Improvements in Tools for and Processes of Repairing Pipes; and I do hereby declare the following to be a full, clear, and exact description of the invention, such as will enable others skilled in the art to which it appertains to make and use the same.

My invention relates to tools for repairing water and gas mains, service-pipes, &c.

It has for its object to provide a tool which can be comparatively easily inserted in a pipe against the pressure of the fluid therein after said pipe has been cut for repairs and said tool being clamped in said pipe, after which and while said tool, serving as a stopper, is in place the end of said pipe may be threaded and a stop-cock turned on, after which the stopper may be removed, the cock closed, and the work of repairing continued without cutting off the main or shutting down a whole factory, as would be the case in the event of the bursting of a steam-pipe.

To this end the invention consists of a rod having a cone-shaped head on which are mounted tubular sections of rubber or other suitable elastic material and on each side of said tubular sections washers with beveled surfaces facing said tubular sections are placed, and means consisting, preferably, of a collar and handle portion turning on a thread on the end of said rod is provided for compressing said washers on said rod, whereby said rubber washers are expanded to engage the inner walls of the pipe to stop the last named.

In the accompanying drawings, illustrating the preferred embodiment of my invention, Figure 1 is an elevation of my invention, part of the rod and casing being broken away. Fig. 2 is a cross-sectional view showing the device inserted into the end of a pipe before the tubular sections of rubber have been expanded, part of the tool being broken away near the pipe. Fig. 3 is a similar view after said tubular sections of rubber have been expanded and the thread cut on the end of the pipe, part of the tool also broken away. Fig. 4 is an elevation of the pipe with the stop-cock turned thereon before the tool is withdrawn, the valve-stem of the cock being removed and part of the tool broken away. Fig. 5 is a similar view after the tool has been withdrawn with the valve-stem of the cock in place. Fig. 6 is a detail view of the washer next to the collar-tube, and Fig. 7 is a detail view of one of the other washers.

Referring more particularly to the drawings, in carrying out my invention I provide a rod 1, provided with a conically-shaped head 2, which may be made integral with said rod or turned on said rod and secured by means of a cross-pin. On said rod are mounted washers or collars 3, preferably four in number, and tubular sections of rubber 4, of which there are two, each arranged between a pair of the washers. Said washers have their surfaces which face the tubular sections of rubber beveled, as at 5, and the washer farthest from the conical head 2 is provided with a neck portion 6, adapted to fit within the end of a tubular shell or casing 7. Said casing is provided with a slot 8, in which works a pin 9, fixed to the rod 1. Said rod is screw-threaded at its extremity, and a handle portion 10, provided with a screw-threaded socket for that purpose, is adapted to turn thereon and engage the casing 7 for compressing the washers into a smaller longitudinal space on said rod, thereby causing their beveled surfaces to enter within and expand the rubber sections. The handle is provided with a neck portion 11 to receive the casing and guide the same, while the pin 9 prevents said casing and washers from becoming disconnected from the rod 1.

A horn-shaped deflector 12, adapted to prevent the water or steam from coming in contact with the hands or person of the operator when the tool is inserted in the end of the pipe from which the fluid is flowing, may be slipped on over the handle onto the collar tube or casing. Said deflector is provided with a sleeve 13, which is adapted to fit snugly over a rubber collar 14. In practice said collar is slipped on first and the deflector put on afterward and fitted over it. A clamp may be placed around the sleeve 13, if desired, to secure it in place on the casing.

In case there is a burst, leak, or defect in a steam, gas, or water main or service-pipe my invention provides means for repairing the same without cutting off the flow of fluid at the source of supply to the defective branch, as the pipe can be uncovered, cut off, and my tool inserted and made fast in position by expanding the rubber sections, so that they engage the inner walls of the pipe and cut off the flow of the fluid. The end of the pipe can then be threaded, the deflector removed, and the stop-cock 15, with its valve-stem removed, slipped over the tool and turned on the end of the pipe. The tool is then withdrawn, the rubber washers having been first released by turning the handle reversely, and the valve-stem inserted into the stop-cock, when the pipe will be closed, so that the repairs can be proceeded with. The stop-cock can be allowed to remain permanently and the next section of pipe turned into its other side, or when the repairs have been completed at some time, as at night, when the pressure can be cut off, said stop-cock can be removed and the next pipe-section coupled on by an ordinary union.

In case the tubular sections of rubber become injured they are readily replaced by new ones, which can be placed on the rod when the washers have been removed.

My device is compact, the handle, casing, washers, and head are about the same diameter, and the head being pointed or conically shaped does not present much resistance against the pressure in the pipe, so that it can with comparative ease be pushed into said pipe.

I am aware that changes may be made in my invention without departing from the spirit or sacrificing the advantages thereof. I therefore reserve the right to make such changes as fairly fall within the scope of my invention.

If desired, in place of the handpiece for operating the stem of the stop-cock 15 the end of said stem may be squared, as shown in dotted lines in Fig. 5, so that it may be operated by a wrench.

Having thus described my invention, what I claim as new, and desire to secure by Letters Patent, is—

1. In a device of the character described, the combination with a rod, washers mounted on said rod, elastic tubular sections also mounted on said rod, said washers having beveled surfaces facing said elastic sections, a tubular casing on said rod adapted to abut at one end against one of said washers, and a handle having screw connection with said rod and engaging the other end of said casing, said casing having a slot therein, of a pin fixed to said rod and adapted to engage the slot in said casing.

2. A device substantially as herein shown and described comprising a rod having a conically-shaped head, washers having beveled surfaces mounted on said rod, elastic tubular sections also mounted on said rod between the beveled surfaces of said washers, a tubular casing having a slot, one of said washers having a sleeve projecting between said rod and casing, said rod having a pin fixed thereto engaging the slot in said casing, a horn-shaped deflector mounted on said casing, and a handle having screw connection with said rod and provided with a sleeve projecting within the end of said casing.

In testimony whereof I affix my signature in presence of two witnesses.

JOHN HENRY CHRISTMAN.

Witnesses:
F. B. MENTZER,
F. H. HOFFER.